United States Patent [19]

Kägi et al.

[11] 4,296,774

[45] Oct. 27, 1981

[54] DEVICE FOR DETACHABLY COUPLING THE ORIFICE OF A BRANCHLINE TO A LINE CARRYING A PRESSURE MEDIUM

[75] Inventors: Bruno Kägi, Meilen; Georg Hirmann, Zurich; Rolf Luginbühl, Küsnacht, all of Switzerland

[73] Assignee: Bachofen AG., Uster, Switzerland

[21] Appl. No.: 68,614

[22] Filed: Aug. 22, 1979

[30] Foreign Application Priority Data

Aug. 25, 1978 [CH] Switzerland .................. 9003/78
Apr. 17, 1979 [CH] Switzerland .................. 3595/79
Jul. 20, 1979 [CH] Switzerland .................. 6788/79

[51] Int. Cl.³ .................. F16L 29/00; F16L 37/28
[52] U.S. Cl. .................. 137/322; 137/580; 222/506; 222/509; 251/25; 251/65
[58] Field of Search .................. 137/322, 580; 222/506, 222/507, 509; 239/569; 251/25, 30, 65, 149

[56] References Cited

U.S. PATENT DOCUMENTS

| | | | |
|---|---|---|---|
| 951,519 | 3/1910 | Bacigalupi | 137/322 |
| 2,798,506 | 7/1957 | Baker et al. | 137/580 |
| 3,012,574 | 12/1961 | Baker et al. | 137/580 |
| 3,195,562 | 7/1965 | Nelson et al. | 137/322 |
| 3,283,777 | 11/1966 | Meyer et al. | 137/322 |
| 3,310,067 | 3/1967 | Meyer | 137/580 |
| 3,326,234 | 6/1967 | Baker et al. | 137/580 |
| 3,348,543 | 10/1967 | Stafford | 251/65 |
| 3,580,401 | 5/1971 | Stahl | 137/580 |
| 4,216,794 | 8/1980 | Standal | 137/322 |

FOREIGN PATENT DOCUMENTS

2262488 2/1975 France .
1481102 7/1974 United Kingdom .

*Primary Examiner*—Martin P. Schwadron
*Assistant Examiner*—G. L. Walton

[57] ABSTRACT

A device for detachably coupling the orifice of a branchline to a line carrying a pressure medium and having a plurality of discharge valves spaced apart from each other in the line wall, the coupling being carried out by means of a coupling device which is movable over the length of the line and contains the orifice and opens one of the discharge valves. The discharge valves are mounted in the line with magnetically actuating opening members and the coupling device is provided with a coupling element guided thereon and is provided with an automatically sealing coupling member in the coupling position with the discharge valve at the pressure side for an automatic alignment with the orifice, and an actuator which magnetically cooperates with the opening member and the coupling member.

20 Claims, 12 Drawing Figures

DEVICE FOR DETACHABLY COUPLING THE ORIFICE OF A BRANCHLINE TO A LINE CARRYING A PRESSURE MEDIUM

BACKGROUND OF THE INVENTION

The invention relates to a device for detachably coupling the orifice of a branchline to a line carrying a pressure medium and having a plurality of discharge valves disposed in distance apart from each other in the line wall, with the coupling being accomplished by means of a coupling device which is movable throughout the length of the line and which contains the orifice and opens one of the discharge valves.

Coupling devices are known which are stationarily mounted on a branch of a pressure line. In such pressure lines the coupling is carried out by a coupling member which is inserted against the pressure and which is removed for decoupling. The disadvantage is that, when changing the operating site, the coupling device may be displaced only with a high cost of labor.

Furthermore, a device is known (from U.S. Pat. No. 3,195,562), wherein a coupling device is movable parallel to a pressure line which is coupled with discharge valves at the pressure line. For this purpose, a double-sided, inclined guide channel is provided for each coupling, through which a pretensioned plunger for opening the discharge valve is mounted in the coupling device. The structural costs for this embodiment is considerable and large displacement forces are required in the area of the discharge valves.

SUMMARY OF THE INVENTION

It is an object of the invention to provide a device for the aforementioned type in such a manner that the coupling in longitudinal direction of a pressure line is made possible with low structural costs and to achieve a high degree of operational safety, with a high degree of operating comfort and a high degree of economics.

This object of the invention is obtained by mounting the discharge valves in the line with magnetically actuated opening means, and by providing the coupling device with a coupling element guided on the line and with automatically sealing coupling means in the coupling position with the discharge valve at the pressure side for an automatic alignment with the orifice, and actuating means which magnetically cooperate with the opening means and the coupling means.

BRIEF DESCRIPTION OF THE DRAWINGS

The invention is shown in different embodiments in the drawings, in which.

DETAILED DESCRIPTION OF PREFERRED EMBODIMENTS

Figure 1:
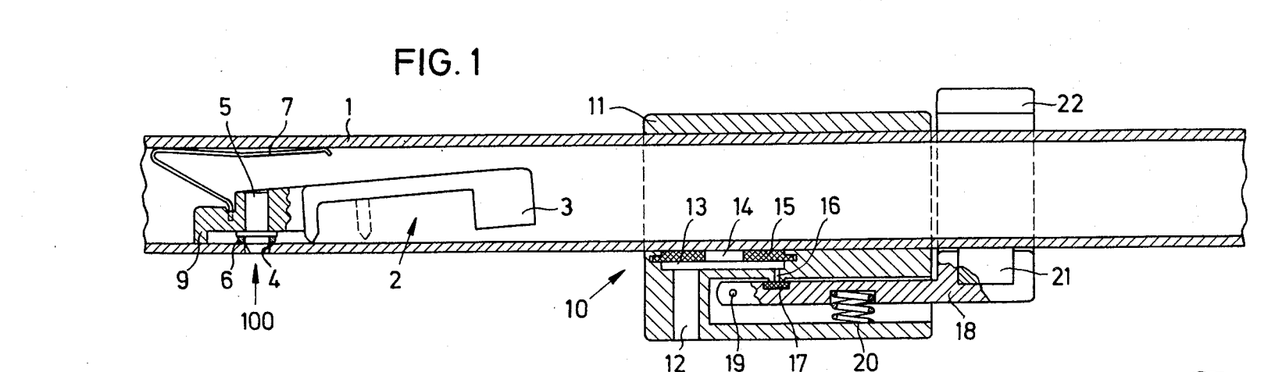
FIG. 1 is a schematic, cross-sectional view of the inventive device in uncoupled position.
Figure 2:
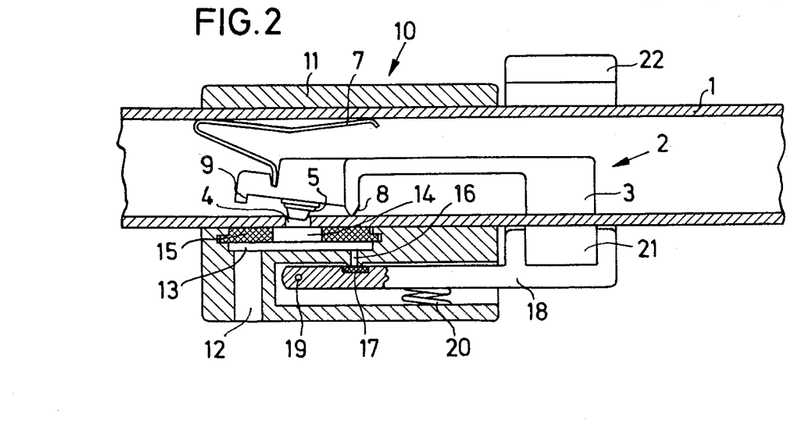
FIG. 2 shows the device of FIG. 1 in coupled position.
Figure 3:
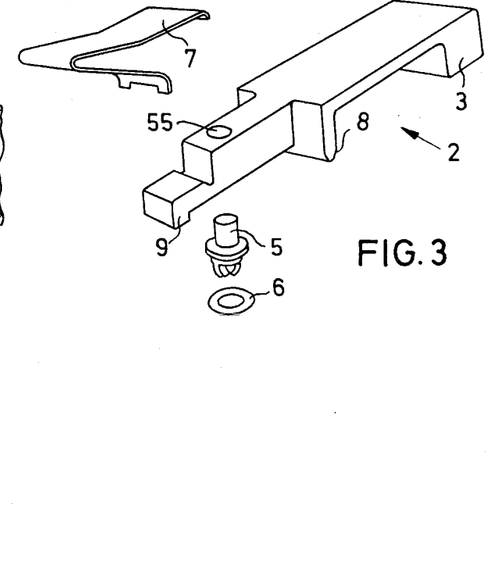
FIG. 3 is a perspective view showing the structural elements of a discharge valve of the device in accordance with FIGS. 1 and 2, separately.

As shown in FIGS. 1 and 2, a pressure line 1, for example, a square shaped pipe, carries a displaceable coupling device with a coupling element 10 which can be brought into active connection with a tap connection 100 at the pipe.

The tap connection 100, of which the pressure line generally comprises several, is provided with a bore 4 the inner shoulder of which provides a seat for a movable valve element 5 which is mounted at the end of a valve lever 2 consisting of an iron element 3. The valve lever 2 with the movable valve element 5, a sealing ring 6 and a locking spring 7 form the movable valve portion (part) of the discharge valve which can be opened.

The valve lever 2 is provided with a tilting rib 8 for example, with a knife-edge support. A second tilting rib may be provided, shown in dotted lines in FIG. 1, so as to enlarge the opening stroke. The outer end of valve lever 2 is shaped as a magnetic active part 3, for example, as a soft iron element. The valve element 5 is disposed in a bore 55 of valve lever 2.

As shown in FIG. 1, the closing spring 7 is supported on the upper wall of pressure line 1 and acts, with its pretensioned end, on the end of lever 2 in such a manner that valve element 5 closes valve bore 4, while the abutment face 9 engages the wall of pressure line 1, and the end 3 is lifted from the wall of pressure line 1.

The coupling element 10 which is to be coupled to the discharge valve, is provided with a guide 11 which encompasses the pressure line 1 in such a manner that its displaceability on pressure line 1 is assured. It is provided with a line orifice 12 which is connected via a pressure chamber 13 and a coupling opening 14 with bore 4 of tap connection 100. Coupling opening 14 is disposed in a membrane 15 placed in pressure chamber 13 and adapted to engage the wall of pressure line 1. When pressure medium flows through the coupling opening 14 into pressure chamber 13 the coupling opening exerts a pressure directed to the inner face of membrane 15 which presses membrane 15 against the wall of pressure line 1.

A relief bore 16 opens into pressure chamber 13, which is closed by a closing element 17 mounted on a lever 18. Lever 18 is on one side mounted on coupling element 10 by means of a bolt 19 and retained in its closed position by means of a spring 20. On its free end, i.e., the end extending from the coupling element 10, the lever 18 supports a permanent magnet 21, for example, a highly alloyed cobalt magnet which in aligned position with the magnet active part 3, pivots the valve lever 2 into opening position (FIG. 2). A pressure key 22 extends upwardly from lever 18 which permits a manual actuation of lever 18 against the effect of spring 20 for interrupting the magnetic circuit between the permanent magnet 21 and the magnetic active part 3, in order to permit opening the relief valve 16 for relieving the pressure on membrane 15.

In order to provide a coupling at the tap connection 100 the coupling element 10 is manually pushed into the position shown in FIG. 2. This pushing to the tap connection 100 can be carried out with a rapid hand movement, without taking into consideration an exact coupling position, since the exact positioning takes place automatically and is then unmovably fixed. When the permanent magnet 21 reaches the area of the magnetic-active end 3 of the valve lever 2, the coupling element immediately opens at the tap connection 100 and the pressure medium can flow into coupling opening 14. Thereby, a pressure builds up in pressure chamber 13 which immediately presses membrane 15 with a high pressure against the pressure line 1, so that a displacement of the coupling device on pressure line 1 is impossible, while at the same time a pressure tight coupling is assured.

The pressure key 22 is actuated for closing the tap connection 100 or for further displacement or return displacement of the coupling device, from the area of tap connection 100, whereby lever 18 is pressed downwardly, which in turn opens the magnet circuit 21, 3, so that the valve lever 2 returns to its closing position, shown in FIG. 1 due to the effect of its associated return spring 7. Simultaneously, the pivot movement of lever 18 opens the relief opening 16 which results in an immediate pressure drop in the pressure chamber 13, whereby membrane 15 is relieved and loses its pressure, so that the coupling element 10 can be easily displaced manually again.

In the same manner, i.e., by pressing the pressure key 22 the coupling element 10 may be displaced over a tap connection 100 without triggering and opening a discharge valve, since the pressed down pressure key 22 removes the permanent magnet 21 in such a manner that the magnet cannot tilt the valve lever 2 against the effect of its return spring 7.

The described coupling procedure takes place in a fraction of a second whereby the required actuating force must merely correspond to the displacement resistance of the coupling device prior to coupling and may be in the dimension of 0.2 kp.

Figure 4:
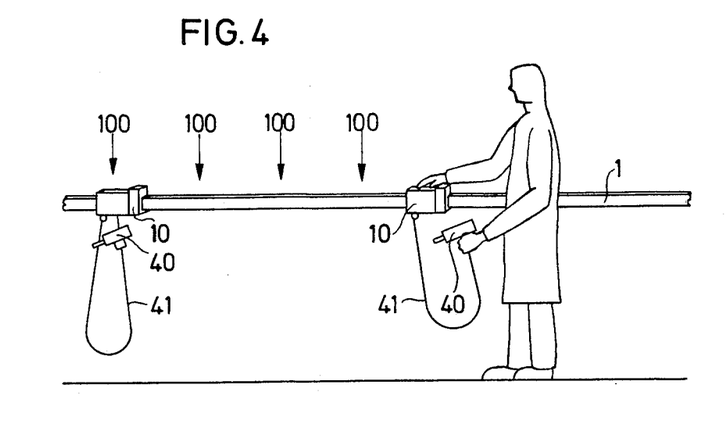
FIG. 4 is a view of the application of the inventive device.

FIG. 4 shows one application example of the described device for air pressure supply for pneumatic tools 40. The pressure line 1 extends at hip height through a working space and supports two coupling devices which are coupled with the tool 40 by means of a hose 41, and which are displaceable on the pressure line 1 and can be brought into contact with one of a plurality of tap connections 100.

Figure 5:
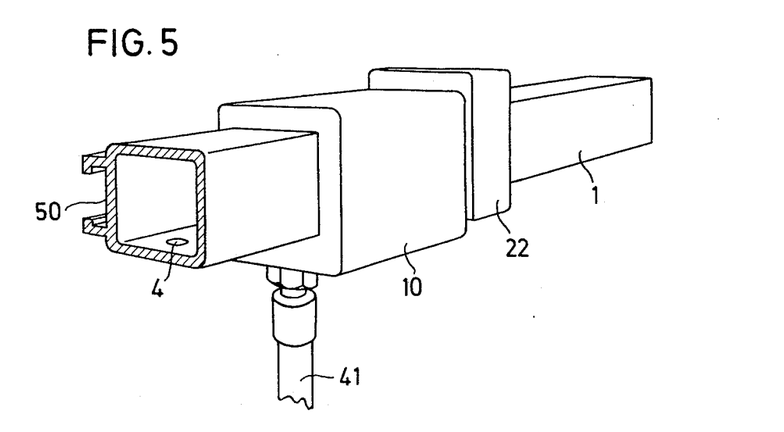
FIG. 5 is a perspective view of a variant of the device of FIG. 1.

FIG. 5 shows a different embodiment of a pressure line 1 with a protruding mounting bar 50, for example, for mounting the pressure line to a wall. The coupling device can be recognized as having the pressure key 22 and hose 41. A discharge bore 4 of a tap connection can be seen in the line profile.

Figure 6:
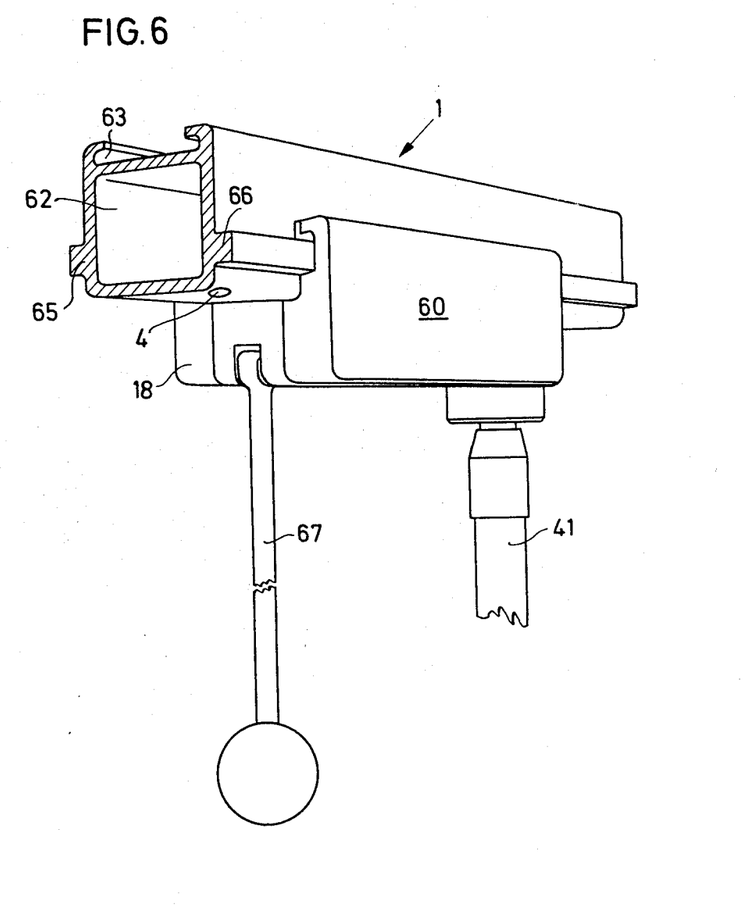
FIG. 6 is a perspective view of a still further variant of the device of FIG. 1.

FIG. 6 shows a further embodiment, wherein the pressure line 1 is in the form of a suspended line having a square-shaped conduit 62 and a valve bore 4. At the upper side the pressure line 1 supports a mounting flange 63 and lateral guiding ribs 65, 66 for receiving a corresponding embodiment variant of a coupling element 60. Instead of the pressure key a pulling rod 76 engages lever 18 and hose 41 is coupled to the discharge opening.

Figure 7:
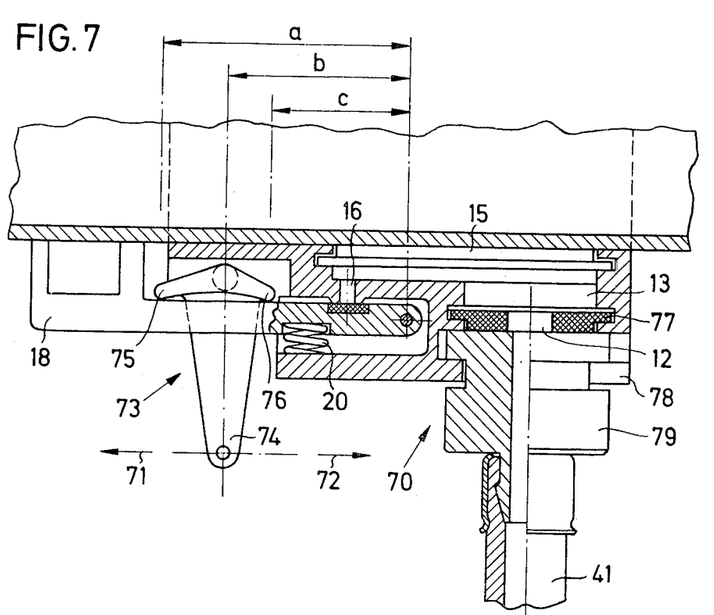
FIG. 7 is a cross-section of the variant of FIG. 6.

The embodiment in accordance with FIG. 7 shows an arrangement similar to the one shown in FIG. 6, with a coupling element 70, in which the position change in one or the other displacement direction 71, 72 is possible with a line parallel effective force. In order to transmit the displacement force in one direction or the other onto lever 18 a lever 73 is provided with an associated actuating arm 74 and support arms 75, 76. When actuating lever 74, lever 18 is moved against spring 20 resulting in a shut-off. The force of spring 20 is so determined that the sliding resistance of the coupling element 70 between the tap connections does not exceed the pretension of the spring. In order to obtain a symmetric behavior of the shut-off force, the lever ratios a:bb:c are chosen. Also, FIG. 7 shows the possibility of providing the coupling element 70 with a rapid coupling for a selective coupling of a plurality of consumption stations.

To this end, the lower side of the pressure chamber which already is provided with a membrane 15 at the upper side is provided with a second membrane 77 which at a pressure increase presses against a grooved (groove-stone like) coupling part 79 which is inserted into a guide 8, whereby hose 41 is coupled with coupling part 79.

In addition, the coupling element is also suitable for supplying movable objects when the lever 73 is actuated by means of a spring element for pulling and/or pressure force (not shown). The supply flows until the spring force effects shutting off of the coupling element. A pretension of this spring element during the movement, or skipping of the coupling element to the next valve position, is determined by the friction on the guide.

The continuous supply of a moving consumption station maybe assured either with a coupling element and by intermediary switching of a pressure container as a buffer or by using two phase-displaced operating coupling elements.

Figure 8:
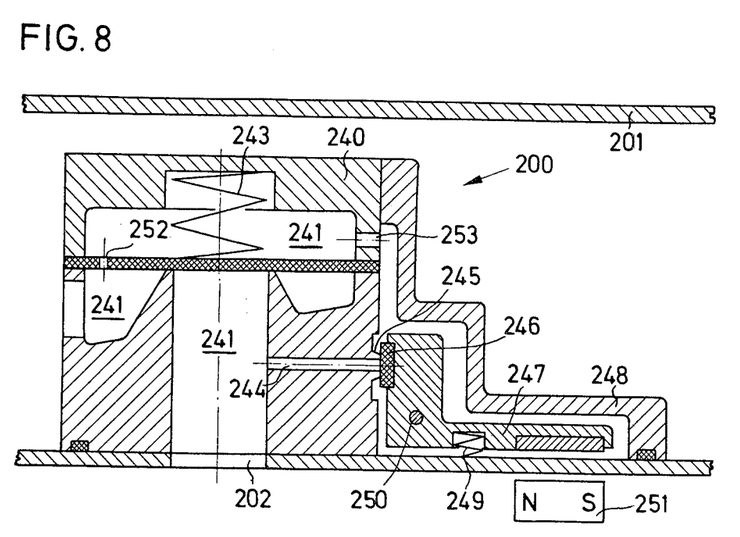
FIG. 8 is a schematic cross-section of a discharge valve.

In order to make do with small magnetic switching elements at the discharge valves, a pre-controlled discharge valve may be used (see FIG. 8). In this case, a valve housing 240 is mounted at the tap connection 200 of pressure line 201 above discharge opening 202 which at the inside supports a closing membrane 242 in a flow through channel or conduit 241. Membrane 242 is loaded in closing direction by a spring 243. A relief channel 244 with a valve seat 245 of a control valve the locking element 246 of which is mounted on a valve lever 247, opens into channel 241. Valve lever 247 is mounted in a flow-tight housing 248 and is tiltable against a locking spring 249 around a pin 250. In this case the actuating of the coupling element (not shown) by means of the actuating part is carried out by means of permanent magnet 251.

In closed condition a closing pressure is generated on membrane 242 and on the movable valve element 246 which corresponds to the inner pressure of line 201, whereby pressure medium flows through a throttle opening 252 in membrane 242 and a connecting opening 253 from through-flow channel 241 into housing 248 of valve lever 247, thus generating a pressure head or dynamic pressure in the housing.

When the valve lever 247 is tilted in clockwise direction by the permanent magnet 251 an immediate pressure relief occurs in channel 241 by selecting suitable cross-sections of the bores or openings 244, 252 and 253, respectively, whereby membrane 242 is pushed open by the medium pressure.

When the magnet circuit is released the control valve 245, 246 is closed again and a closing pressure builds at membrane 242 under the influence of spring 243 which again closes the valve.

Instead of the throttle opening 252 in membrane 242 a flow connection may be provided through housing 248 for lever 247, which may support the movable valve element 246 for the control valve 245, 246 as well as a movable valve element, whereby the movable valve elements can operate alternatively.

Figure 9:
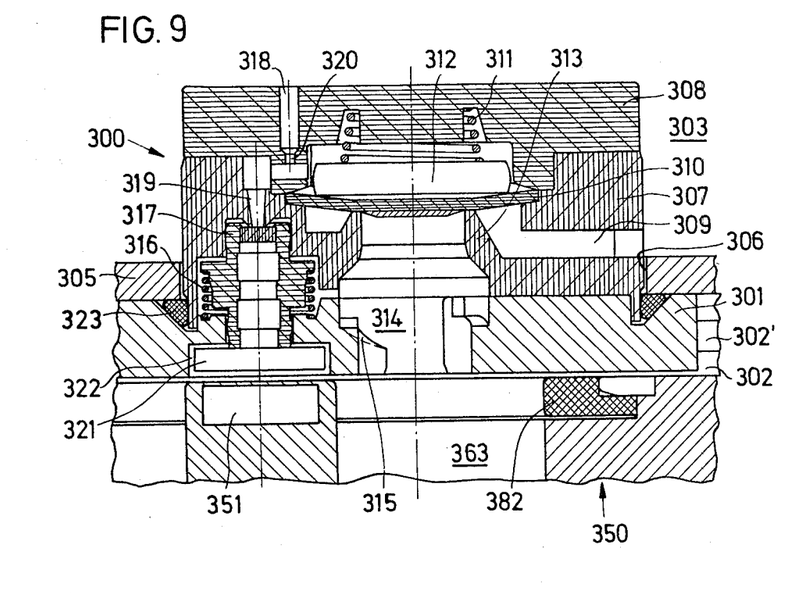
FIG. 9 is a cross-section through a further discharge valve.
Figure 12:
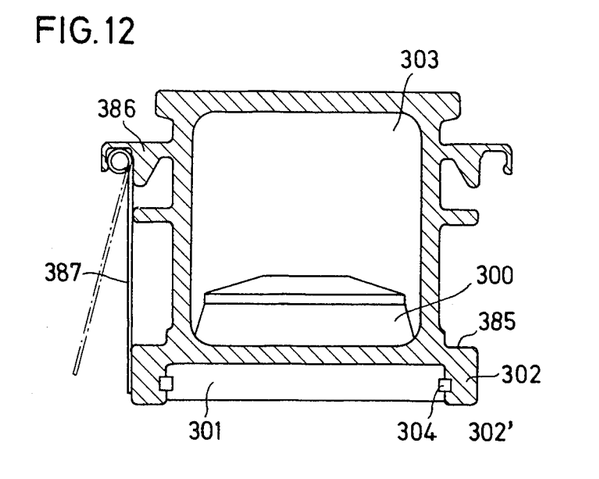
FIG. 12 is a cross-section with the discharge valve in accordance with FIG. 9 installed.

The discharge valve shown in FIG. 9 is mounted on an insert plate 301 which is inserted between two ribs 302 of a square-shaped pipe 303 and is retained by a laterally insertable snap ring 304, as best shown in FIG. 12. The insert plate 301 engages the bottom 305 of square-shaped pipe 303, while the discharge valve 300 extends through an opening 306 in bottom of 305 and into the inside of pipe 303. The discharge valve 300 is provided with a valve element 307 and a valve lid 308, whereby these parts are coupled with insert plate 304 (not shown). A line 309 provides the connection to the inner chamber of line 303, whereby line 309 is closed by membrane 310 disposed between the valve element 307 and the valve lid 308. The membrane is pressed by means of weak springs 311 over a bottom 312 onto a valve seat 313 which is provided in valve element 307, whereby the valve seat surrounds discharge 314 which extends through insert plate 301. In the insert plate 301, discharge 314 is provided with cams 315 of a bayonet catch, with the aid of which a conduit may be directly coupled to discharge 314.

The opening means for opening the discharge valve are a pre-control valve 317 biased by a spring 316 and pre-control lines 318, 319 with a throttle connection 320. When opening the pre-control valve 317 a vacuum exists on the lid side of membrane 310 due to throttle connection 320, which vacuum effects the lifting of the membrane 310 and thereby generates the connection between the line 309 and discharge 314.

The opening of the pre-control valve 317 is done magnetically. In the partly shown coupling device 350 of FIG. 9 which still has to be described, a permanent magnet 351 is provided which cooperates with a soft iron plate 321 mounted on pre-control valve 317. The soft iron plate 321 is mounted in a recess 322 of insert plate 301, so that the slot between the soft iron plate 321 and the permanent magnet 351 can be held very small, to assure safe actuation of the pre-control valve 317. A further advantage of this arrangement consists in that opening of the pre-control valve 317 with mechanical or manual means, without the use of a magnet, is practically not possible.

Figure 10:
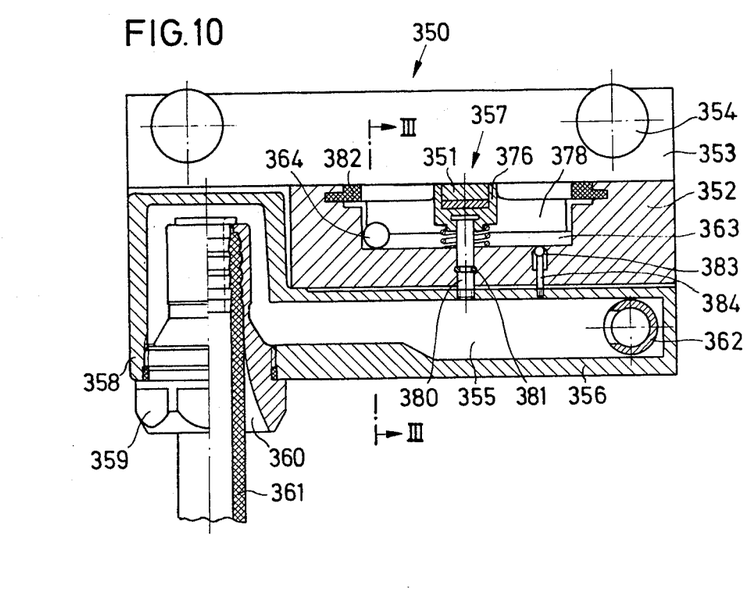
FIG. 10 is a cross-section of a coupling device cooperating with the discharge valve of FIG. 9.
Figure 11:
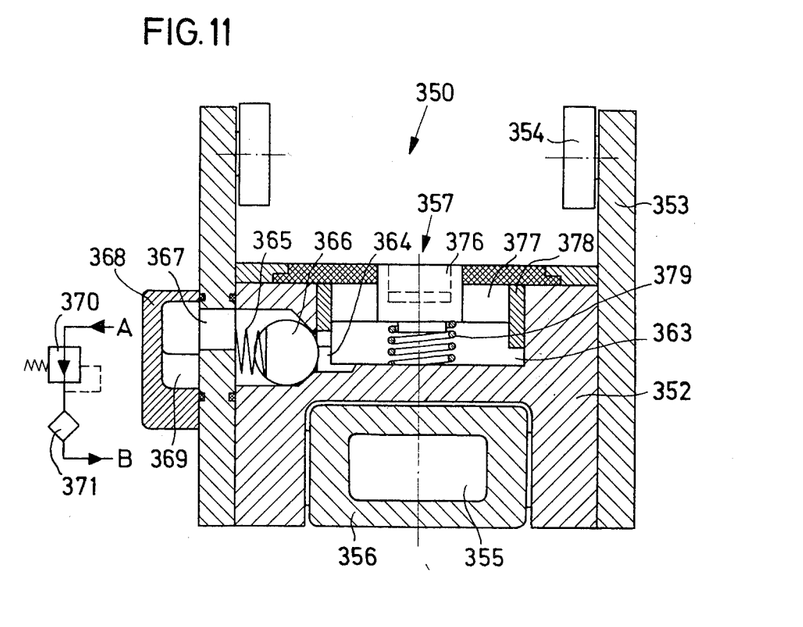
FIG. 11 is a sectional view along line III—III in FIG. 10.

The advantage of the discharge valve 300 consists in that its maintenance is very simple. After removing the snap ring 304 the insert plate 301 can be removed and the valve can be serviced and again inserted. For sealing the pipe 303 to the outside a soft seal 323 is provided in the insert plate 301. Without difficulties a filter may be installed in the pre-control line 318. However, the danger of contamination of the pre-control is already low due to the disposition of the orifice of the pre-control 318 above bottom 305. FIGS. 10 and 11 show the coupling element 350 which is displaceable in longitudinal direction of line 303. The coupling device is provided with a square-shaped coupling element 352, two side plates 353 with rollers 354 at both sides of coupling element 352, a pivot arm 356 mounted in coupling element 352 and having a through-line 355, and actuating means 357 at the side of the line 303 in coupling element 352 for opening the pre-control valve 317. At its free end pivot arm 356 is provided with a coupling head 358 into which a pipe coupling piece 359 with an orifice 360 is screwed for receiving a hose 361.

The pivot arm 356 is pivotable about a hollow pin 362 through which the pressure medium is supplied from line 303 through a pressure chamber 363 and through-line 355.

In the proximity of the bottom of pressure chamber 363 a line orifice 364 is provided through which the pressure medium is supplied from line 303 to hose 361. The connection between orifice 364 and the hollow pin 363 may be used for installing different line components. As can be seen from FIG. 11, orifice 364 forms the seat of a check ball 366 biased by a spring 365. The pressure medium flows through an opening 367 in the side plate 353 into a hollow flange 368 mounted at the side plate 353, whereby the recess of the hollow flange forms an outer connecting line 369 between orifice 364 and the inlet to hollow pin 362. This connection which is disposed at the outside of side plate 353 may be used to install line components, for example, a pressure control valve 370 and an oil cup 371 or the like, as shown schematically on the left side of FIG. 11. The inlet A constitutes the supply line from orifice 364 and B the discharge into the hollow pin 362. It is also possible to install further line components or only one line component.

The opening means which are provided in the pressure chamber 363 have an apertured insert element with a central body 376 and guide walls 378 connected by ribs 377. A spring 379 presses on central body 376. Furthermore, a connection exists (see FIG. 2), between the central body 376 and the pivot arm 356 in the form of a pulling rod 380 which is sealed in the coupling element by a seal 381. When the pivot arm 356 is pivoted away from line 303 by pulling hose 361 the opening means, i.e., the central body 376 with permanent magnet 351, are moved away from line 303, so that the actuating means 357 of the discharge valve 300 cannot be actuated and the discharge valve remains closed when moving the coupling device 350. Instead of the permanent magnet 351 an actuating roller may be provided in central body 376 which acts on the buffer rod of the pre-control valve 317. When the pivot arm 356 is not pulled, the pre-control valve 317 is opened when in alignment with central body 376. The pressure medium which enters pressure chamber 363 acts on the rear side of a seal membrane 382 which is pressed against the insert plate 301, thus establishing a pressure tight coupling between the insert plate 301 and the coupling device 350.

For detaching the coupling the pressure chamber 363 is vented through a vent valve 383 which is actuated by a buffer rod 384 which is coupled with pivot arm 356.

The individual parts of the discharge valve and the coupling device may consist partly of plastic or metal. The square pipe 303 is essentially an extruded profile at which the ribs 302 for receiving the insert plate 301 are provided. The ribs 302 form at its upper side a running face 385 for rollers 354 of coupling device 350. A further rib 386 may be provided on line 303 for receiving a curtain 387 (FIG. 12).

Operating the coupling device with the aid of hose 361 is particularly simple. By an inclined pulling of hose 361 the coupling is detached, i.e., a coupling is prevented and the coupling device 350 is displaced on the line 303 without opening the discharge valve. When the coupling device 350 is moved without pulling hose 361 the coupling of orifice 364 or hose 361 to line 303 is executed.

In the described embodiments the coupling means, in particular the membranes for sealing the pressure side of the line of the pressure chamber are mounted in the coupling element. However, it is also possible to arrange these membranes at the pressure line. This means, that one membrane is required for each discharge valve. Possible wear and tear of the membrane thus is distributed to a plurality of membranes.

If an indication of the pressure for the branchline is required, a pressure gauge readable from below may be arranged at the tilting arm 356 (FIG. 8).

It is, of course, to be understood that the invention is not limited to the embodiments described above, but only by the scope of the appended claims.

We claim:

1. A device for detachably coupling an orifice of a branchline to a conduit carrying a pressure medium and having a plurality of discharge valves disposed spaced apart from each other along said conduit, each of said valves having a discharge opening, and a closing element as well as opening means for each of said openings, each of said discharge valves including an expansible chamber for receiving the pressure medium therein for maintaining said closing element in a position to close the respective openings, a coupling device having said orifice disposed therein, said coupling device being longitudinally displaceable along said conduit and connectable with the conduit by opening one of the discharge valves, said coupling device being guided along said conduit and having sealing and coupling means becoming effective automatically in the coupling position with the discharge opening being at least partially in alignment with the orifice, and actuating means effective to open the respective one of said discharge valves magnetically via pre-control means without physically contacting the same in the coupling position of the coupling device for bleeding the expansible chamber of the respective discharge valve, said actuating means including magnetic control elements on the side of the displaceable coupling device and on the side of any of the different discharge valves such that by displacing the coupling device a selected one of the discharge valves can be opened and connected with the orifice of the branchline.

2. A device according to claim 1, wherein said magnetic control elements are arranged so as to automatically bring said orifice and the discharge opening of a selected discharge valve in at least partial alignment.

3. A device for detachably coupling an orifice of a branchline to a conduit carrying a pressure medium and having a plurality of discharge valves disposed spaced apart from each other along said conduit, each of said valves having a discharge opening, and a closing element as well as opening means for each of said openings, each of said discharge valves including an expansible chamber for receiving the pressure medium therein for maintaining said closing element in a position to close the respective openings, a coupling device having said orifice disposed therein, said coupling device being longitudinally displaceable along said conduit and connectable with the conduit by opening one of the discharge valves, said coupling device being guided along said conduit and having sealing and coupling means becoming effective automatically in the coupling position with the discharge opening being at least partially in alignment with the orifice, and actuating means effective to open the respective one of said discharge valves magnetically via pre-control means without physically contacting the same in the coupling position of the coupling device for bleeding the expansible chamber of the respective discharge valve, said coupling device comprising a pressure chamber with a coupling opening, and sealing means and valve seat means surrounding said coupling opening and said discharge opening, the sealing means being arranged in connection with said pressure chamber so as to be automatically pressed against said valve seat means when the pressure chamber is pressurized by magnetically opening the discharge valve.

4. A device according to claim 3 comprising a venting valve adapted to be acted on by said actuating means so as to de-pressurize the pressure chamber for disengaging said sealing means from said valve seat means and releasing the coupling device.

5. A device in accordance with claim 3, comprising a discharge opening into said pressure chamber, and a closing member controlling said discharge opening, said closing member being coupled with said actuating means.

6. A device in accordance with claim 5, wherein said actuating means include a pivot arm which supports said closing member.

7. A device in accordance with claim 6, wherein said pivot arm connects the orifice with said branch conduit.

8. A device in accordance with claim 7, comprising a check valve between said orifice and said pivot arm.

9. A device in accordance with claim 6, wherein said pivot arm is pivoted at one side thereof to said coupling element, a spring holding said arm in a position closing said orifice and a permanent magnet carried by said arm.

10. A device in accordance with claim 9, comprising a hose for actuating said pivot arm.

11. A device in accordance with claim 3, wherein each discharge valve comprises a movable valve element which cooperates with a bore in the wall of said pressure medium conduit, said valve element being disposed on one end of a pivotable valve arm, the other end of which has a magnetically active part.

12. A device according to claim 11, wherein said magnetically active part is a soft iron part.

13. A device in accordance with claim 11 or 12, comprising a spring subjecting the valve arm to a force for closing said valve element.

14. A device in accordance with claim 3, wherein said discharge valve is a valve provided with a pre-control valve having an elastic sealing member for a discharge opening.

15. A device in accordance with claim 14, wherein said opening means comprises a magnetically actuable pre-control valve including a first opening part disposed in a recess of said plate, and a second opening part, which forms a part of said actuating means.

16. A device according to claim 15, wherein one of said opening parts is a permanent magnet and the other opening part is a soft iron element.

17. A device in according with claim 3, comprising an insert supporting the discharge valve and the opening means which cooperate with the actuating means in said coupling element, said insert being adapted to be mounted on the wall of said pressure medium conduit, said conduit having two ribs, said insert being a plate insertable between said two ribs, snapping retention means holding said plate between said two ribs, said retention means having a snap ring disposed in said ribs of said plate.

18. A device in accordance with claim 17, comprising selectively insertable elements, mounted on said coupling element between said orifice and said pivot arm.

19. A device according to claim 18, wherein said insertable element is a pressure control element.

20. A device according to claim 18, wherein said insertable element is an oiling element.